(12) United States Patent
Lee et al.

(10) Patent No.: US 6,293,026 B1
(45) Date of Patent: Sep. 25, 2001

(54) METHOD OF MEASURING HEIGHT OF FOOT ARCH

(75) Inventors: Eun K. Lee, Kyunggi-do; Dong H. Kim, Seoul; Hee T. Kim, Seoul; Shin C. Kang, Seoul; Young C. Kim, Seoul; Sei K. Moon, Seoul; Seong Y. Bae, Kyunggi-do; Gyo T. Seo, Chungchongbuk-do; Jong C. Lee, Seoul; Choon K. Zhoh, Seoul; Choong N. Cho, Seoul; Jong S. Lee, Kyunggi-do; Dae Y. Yang, Kyunggi-do, all of (KR)

(73) Assignee: Osan College, Kyuggi-do (KR)

( * ) Notice: Subject to any disclaimer, the term of this patent is extended or adjusted under 35 U.S.C. 154(b) by 0 days.

(21) Appl. No.: 09/456,576

(22) Filed: Dec. 8, 1999

(30) Foreign Application Priority Data

Dec. 31, 1998 (KR) .................................. 98-63187

(51) Int. Cl.[7] .............................. A61B 5/107; G01B 5/20
(52) U.S. Cl. ............................... 33/512; 33/514.2; 33/515
(58) Field of Search ................................. 33/512, 514.2, 33/515; 12/1 G, 21

(56) References Cited

U.S. PATENT DOCUMENTS

| | | | | |
|---|---|---|---|---|
| 1,826,783 | * | 10/1931 | Hess ..................................... | 33/514.2 |
| 1,830,648 | * | 11/1931 | Engel .................................. | 33/514.2 |
| 2,162,916 | * | 6/1939 | Hyland ................................ | 33/514.2 |
| 2,298,037 | * | 10/1942 | Crandell ................................. | 12/21 |
| 2,330,317 | * | 9/1943 | Stewart ................................ | 33/515 |
| 2,472,754 | * | 6/1949 | Mead .................................... | 33/515 |
| 5,640,779 | * | 6/1997 | Rolloff et al. .......................... | 33/512 |

* cited by examiner

*Primary Examiner*—Christopher W. Fulton
(74) *Attorney, Agent, or Firm*—McGuireWoods LLP

(57) ABSTRACT

A method of measuring the height of a foot arch precisely and easily using two essential heights of the foot arch is disclosed. In the method, a foot cast is primarily cast by pouring plaster into a foot mold. Thereafter, a first intersecting point and a second intersecting point are determined. The first intersecting point is determined by making a first line and a third line intersect. The second intersecting point is determined by making a second line and the third line intersect. The first line is a straight line extending from the center of the second toe to the center of the heel end. The second line is a straight line extending from the center of the big toe to a point spaced apart inwardly from the center of the heel end by ⅛ of the total distance of the heel end. The third line is a center line of the transverse arch of the foot. Finally, a first height and a second height are measured while the foot pattern is set in an upright position. The first height is defined between a flat base level and the first intersecting point, while the second height is defined between the base level and the second intersecting point.

1 Claim, 3 Drawing Sheets

METHOD OF MEASURING HEIGHT OF FOOT ARCH

BACKGROUND OF THE INVENTION

1. Field of the Invention

The present invention relates, in general, to a method of measuring the height of a foot arch during a process of manufacturing arch supports equipped in shoes and, more particularly, to a method of measuring the height of a foot arch precisely and easily using two essential height measurements of the foot arch.

2. Description of the Prior Art

A foot arch is the raised curve on the bottom of the foot and relieves external impact applied from the ground to the foot during walking or running. The foot arch also allows a person to more easily, smoothly and effectively walk or run while relieving fatigue of the feet.

The feet of people are different in shape of the arch due to various physical conditions of people and are classified into three types; a normal foot, a flat foot, and a hollow foot, in accordance with the height of the foot arch. The flat foot is free from such an arch or has a negligible arch, and such a foot fails to effectively relieve the external impact during walking or running and prevents a person from easy or smooth walking or running on the ground. Therefore, the flat foot causes the person to easily and quickly experience fatigued feet during exercising, thus reducing the exercising efficiency.

How to support the foot arch properly is considered as an important factor in a process of manufacturing shoes. In a shoe, the foot arch is generally supported by an arch support, made of leather felt or rubber foam, fixed on an inner sole, thereby to evenly support the weight of a person applied to the feet while standing, walking or running. When the foot arch is supported by a proper arch support, the health and function of the foot is improved.

Since an arch support manufactured imprecisely causes the feet to be undesirably deformed and to become sore, the arch support has to be designed precisely under consideration of the anatomical structure and physiological function of the feet.

Incidently, it is very difficult to measure the height of a foot arch precisely and to produce an arch support precisely because the foot arch has an atypical shape.

A two-dimensional method of estimating the height of a foot arch is known to those skilled in the art. The two-dimensional method consists of four steps. Of the four steps, the first step is to obtain a first footprint by putting an inked foot upon a test paper while a person is sitting on a chair and the weight of the person is not being applied to the foot. The second step is to obtain a second footprint by putting the inked foot upon another test paper while the person is standing up and the weight of the person is being applied to the foot. The third step is to obtain a third footprint by putting the inked foot upon a rubber mat while the person is walking on the mat. Of the above three steps, each of the first and second steps is so-called a "static footprint test" in the field, while the third step is so-called a "dynamic footprint test". The third step is followed by the fourth step wherein the height of a foot arch is estimated with the footprints obtained in the previous three steps.

In the fourth step, the estimation of height is performed by comparing the position of an arch line AR or AR' of the footprints with the position of the reference line Y. In such a case, the reference line Y is a straight line extending from the center of the second toe to the center of the heel end.

The estimation of the height of the foot arch in the fourth step is described in more detail as follows: When the arch line of a footprint does not reach the reference line Y as shown by the dotted line AR' in FIG. 1, the foot arch is estimated to be relatively low. On the other hand, when the arch line of a footprint passes the reference line Y as shown by the solid line AR in FIG. 1, the foot arch is estimated to be relatively high.

The reason why the line Y is used as a base line in the estimation is as follows. The weight of a person is typically concentrated on both the center of the second toe and the center of the heel end during walking or running. Therefore, when a person, wearing shoes manufactured without considering the above-mentioned point, walks or runs on the ground, the weight of the person is concentrated on the side of shoe, thereby causing the person fall down on the ground.

However, the conventional two-dimensional method is problematic in that the estimation of the height of the foot arch using plane footprints may prevent the height of the resulting arch support from coinciding with the actual height of the foot arch.

To solve the problem of the conventional two-dimensional method, a three-dimensional method of obtaining the height of a foot arch was proposed. The conventional three-dimensional method comprises the following three steps. That is, firstly, a variety of foot arch gauges, having different heights and individually having the shape of a foot arch, are provided. Secondarily, a foot arch gauge of the most similar height is selected by comparing the gauges with the actual foot arch one by one. Finally, the height of the selected foot arch gauge is taken for the height of the actual foot arch.

However, according to the conventional three-dimensional method, since it is almost impossible to provide all heights of foot arch gauges for all kinds of feet, a difference occurs between the height of an actual foot arch and the height of a foot arch gauge. Accordingly, the arch support manufactured according to the three-dimensional method fails to support the weight of the person evenly, thereby inducing pain, horniness, and deformation of the feet.

SUMMARY OF THE INVENTION

It is, therefore, an object of the invention to provide a method of measuring the height of a foot arch, which measures the height precisely and easily in a way such that the measured height substantially meets an individual foot arch of a person.

To achieve the object, this invention provides a method of measuring the height of a foot arch precisely and easily by measuring two essential heights of the foot arch, comprising the steps of: forming a mold by pressing a foot of a person on a mold form, made of a material easily deformable initially and hardly deformed after the initial deformation, and casting a foot cast by pouring plaster into said mold; determining a first intersecting point and a second intersecting point, said first intersecting point being determined by making a first line and a third line intersect, said second intersecting point being determined by making a second line and said third line intersect, said first line being a straight line extending from the center of a second toe to the center of a heel end, said second line being a straight line extending from the center of a big toe to a point spaced apart inwardly from the center of the heel end by ⅛ of a total distance of said heel end, said third line being a center line of a transverse arch of said foot; and measuring a first height and a second height while said foot cast is set in an upright position, said first height being defined between a flat base level and said first intersecting point, and said second height being defined between said base level and the second intersecting point.

BRIEF DESCRIPTION OF THE DRAWINGS

The above object and other objects, features and other advantages of the present invention will be more clearly understood from the following drawings, in which.

DESCRIPTION OF THE PREFERRED EMBODIMENTS

Figure 1:
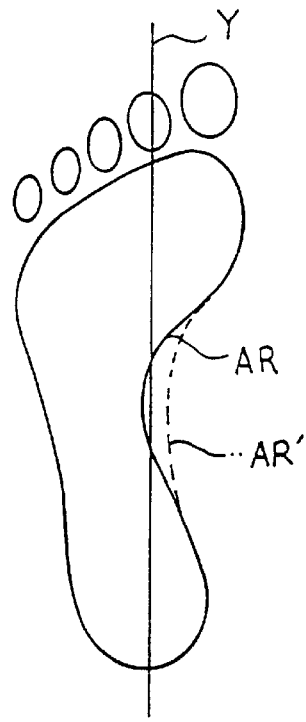
FIG. 1 is a view, showing a method of obtaining the height of a foot arch according to a conventional two-dimensional method.
Figure 2:
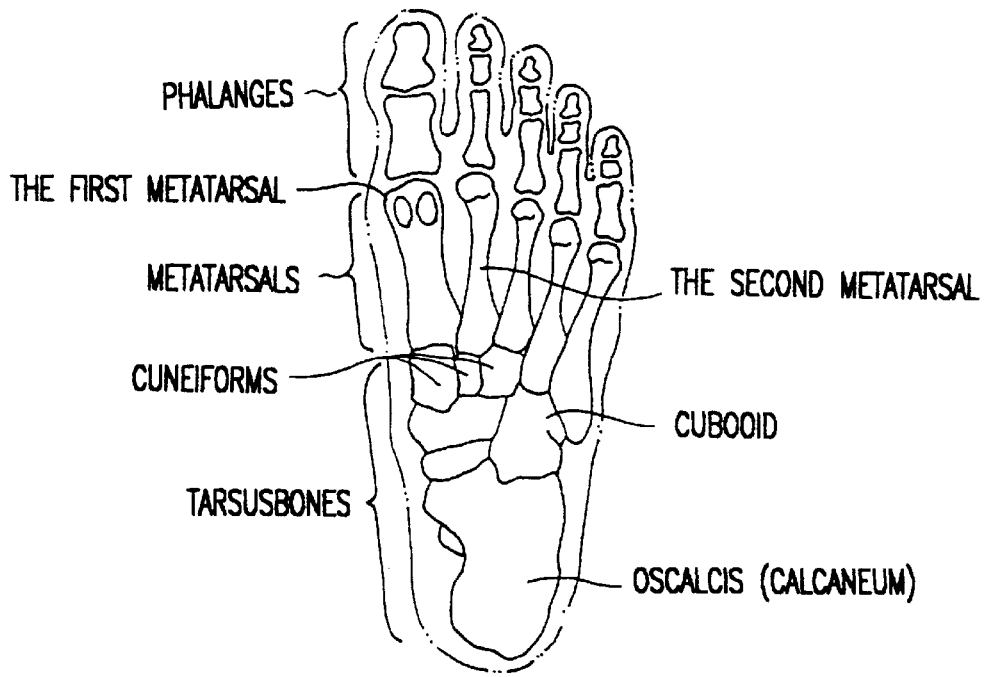
FIG. 2 is a view of the foot bones.
Figure 3:
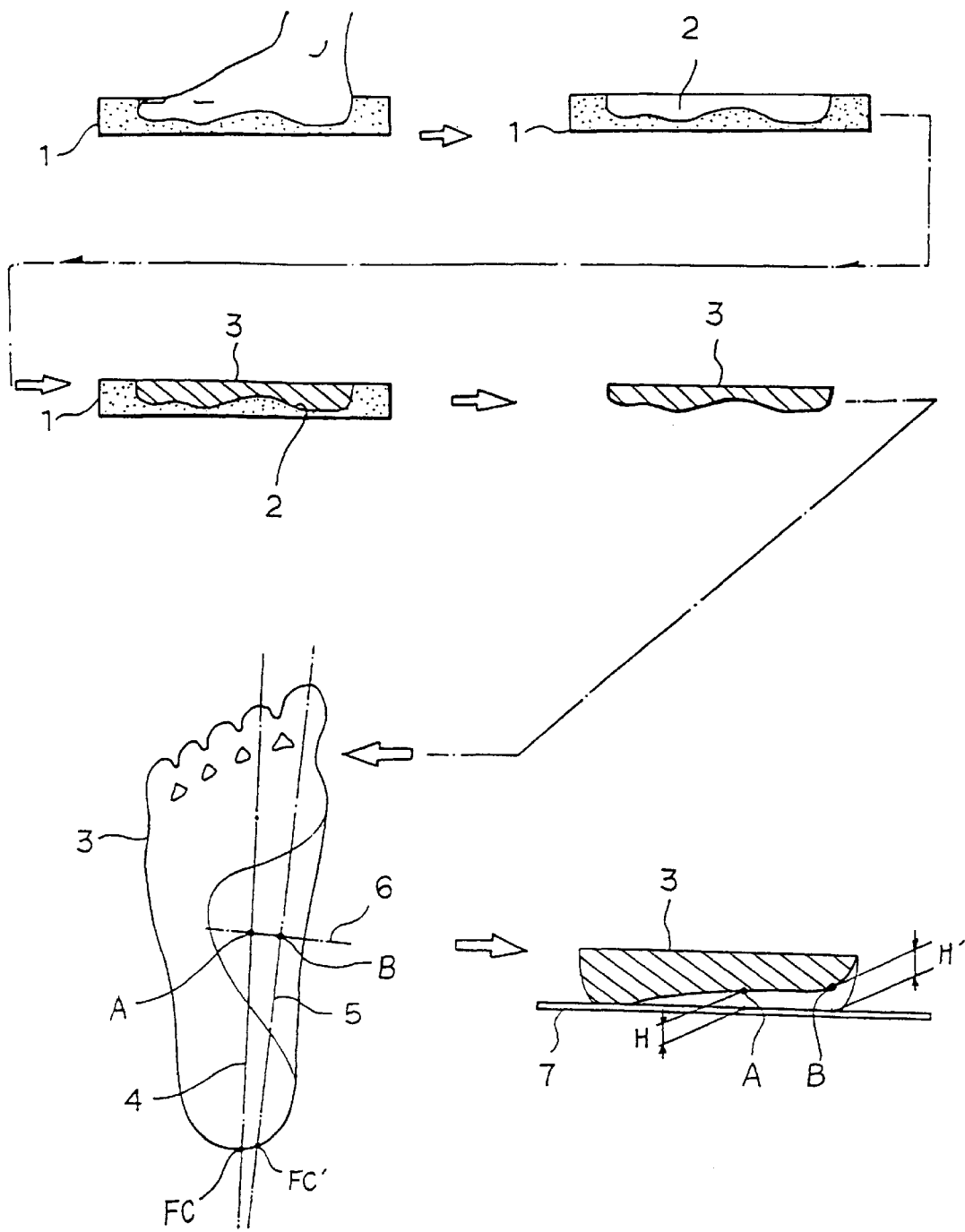
FIG. 3 is a view, showing the process of measuring the height of a foot arch according to the preferred embodiment of the present invention.
Figure 4:
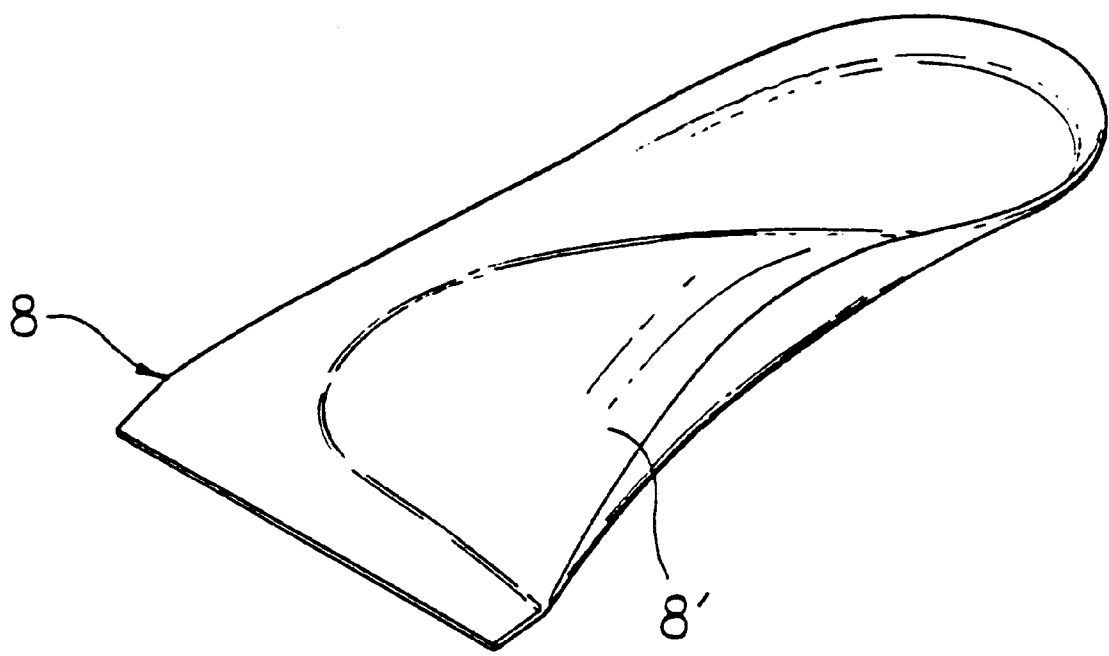
FIG. 4 is perspective view, showing the appearance of an arch support.

The method of measuring the height of a foot arch according to the present invention will be described step by step as follows.

The first step is to form a mold 2 by pressing the foot of a person on a mold form 1, made of a material that is easily deformable initially and is hardly deformed after the initial deformation. A foot cast 3 is, thereafter, cast by pouring plaster into the mold 2.

The second step is to determine a first intersecting point A and a second intersecting point B. The first intersecting point A is determined by making a first line 4 and a third line 6 intersect. The first line 4 is the straight line extending from the center of the second toe to the center of the heel end FC, while the third line 6 is the center line of the transverse foot arch. The second intersecting point B is determined by making a second line 5 and the third line 6 intersect. The second line 5 is the straight line extending from the center of the big toe to a point FC'. This point FC' is spaced apart inwardly from the center of the heel end FC by ⅛ of the total distance of the heel end.

The third step is to measure a first height H and a second height H' using a known measuring instrument while a foot cast 3 is set in an upright position. The first height H is defined between the base level 7 and the first intersecting point A, while the second height H' is defined between the base level 7 and the second intersecting point B.

The reason why this invention uses the first intersecting point A and the second intersecting point B in the measurement is as follows.

The first intersecting point A is placed at the highest position of the first line 4 and at which the first line 4 intersects the third line 6. The second intersecting point B is placed at the highest position of the second line 5 and at which the third line 6 intersects the second line 5. The first and second intersecting points A and B are thus used as the base points to measure the height of a foot arch according to the present invention.

That is, unless the height of a arch foot is measured using the first intersecting point A and the second intersecting point B, the heights of an arch support do not coincide with the actual heights of the foot arch, thereby pressing the reflecting points of the foot unevenly. In the case that the reflecting points of the foot are pressed unevenly for a long time, a bad effect is exerted upon the health of the foot.

Consequently, it becomes an essential requirement for the manufacture of a desirable arch support to measure the first height H and the second height H' and to make the arch support have the same heights as the first height H and the second height H'.

Incidently, when the foot is deformed and the support surface of the foot support becomes lowered, the correction of the heights of the arch support is necessary. In such a case, the first intersecting point A and the second intersecting point B will be used as reference points for the correction.

The reason why the second line 5 is used in addition to the first line 4 is as follows. The precise heights of the three-dimensional foot arch are not obtained because the first line 4 helps only to measure the highest position of the first line 4, i.e. the highest point of the foot arch. However, when the first and second lines 4 and 5 are used in the measurement of the heights of a foot arch, it is possible to measure the highest position of the inner side of the foot arch in addition to the highest point of the foot arch. As a result, since the two essential reference points A and B are used in the measurement of this invention, a desired precise measurement will be accomplished.

Further, the reason why the third line 6 is made to intersect the first line 4 and the second line 5 is as follows: Since the third line 6, i.e. the center line of transverse arch, is the lateral center line of the foot arch and passes the highest point of the foot arch, the third line 6 helps to determine the reference points, thereby to manufacture the arch support precisely. And, since the line 6 passes between metatarsal and tarsal bones, the third line 6 is easily recognizable, thereby reducing the measuring errors and making the measurement easier.

The arch support may be manufactured by heating a material, for example, cork, for the arch support to become deformable, by putting the heated material on the bottom of the foot cast, and by sticking the heated material fast to the bottom of the foot cast with a vacuum suction.

From the above descriptions, it will be understood that this invention helps to measure the height of a foot arch precisely and easily through the steps of determining two essential reference points using three base lines and measuring two essential heights of a foot arch from the two essential reference points. Since the arch support can be manufactured precisely with the two essential heights measured, this invention contributes to conform the heights of the arch support to the heights of an actual foot arch, thus improving the health of the feet by allowing pressure to be applied to the bottom of the feet evenly.

This invention also makes the correction of an arch support precise and easy by providing criterion heights for the correction when the correction of the arch support is required due to a manufacturing error and a deformation of an arch support and for the correction of the feet.

Although the preferred embodiments of the present invention have been disclosed for illustrative purposes, those skilled in the art will appreciate that various modifications, additions and substitutions are possible, without departing from the scope and sprit of the invention as disclosed in the accompanying claims.

What is claimed is:

1. A method of measuring the height of a foot arch, comprising the steps of:

forming a mold by pressing a foot of a person on a mold form, made of a material easily deformable initially and hardly deformed after the initial deformation, and casting a foot cast by pouring plaster into said mold;

determining a first intersecting point and a second intersecting point, said first intersecting point being determined by making a first line and a third line intersect, said second intersecting point being determined by making a second line and said third line intersect, said first line being a straight line extending from the center of a second toe to the center of a heel end, said second line being a straight line extending from the center of a big toe to a point spaced apart inwardly from the center of the heel end by $\frac{1}{8}$ of a total distance of said heel end, said third line being a center line of a transverse arch of said foot; and measuring a first height and a second height while said foot cast is set in an upright position, said first height being defined between a flat base level and said first intersecting point, and said second height being defined between said base level and the second intersecting point.

* * * * *